US006520208B2

(12) United States Patent
Hattori et al.

(10) Patent No.: US 6,520,208 B2
(45) Date of Patent: Feb. 18, 2003

(54) FLUIDIC DEVICE

(75) Inventors: Masakazu Hattori, Gifu (JP); Tsutomu Yasui, Gifu (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 10/163,438

(22) Filed: Jun. 4, 2002

(65) Prior Publication Data

US 2002/0148517 A1 Oct. 17, 2002

Related U.S. Application Data

(62) Division of application No. 09/528,638, filed on Mar. 20, 2000, now Pat. No. 6,435,205.

(30) Foreign Application Priority Data

Dec. 7, 1999 (JP) .......................................... 11-347184

(51) Int. Cl.[7] .............................................. F16K 11/085
(52) U.S. Cl. .................................................... 137/625.2
(58) Field of Search ............................. 137/625.2, 884; 91/462

(56) References Cited

U.S. PATENT DOCUMENTS

| | | | | |
|---|---|---|---|---|
| 4,011,887 A | | 3/1977 | Raymond | |
| 4,080,983 A | | 3/1978 | Stumpmeier | |
| 4,308,892 A | | 1/1982 | Van Ausdal | |
| 4,526,343 A | | 7/1985 | D'Agostino et al. | |
| 4,748,897 A | * | 6/1988 | Hoge et al. | 91/461 |
| 5,046,400 A | * | 9/1991 | Karakama et al. | 91/462 |
| 5,297,469 A | | 3/1994 | Raymond | |
| 5,816,290 A | | 10/1998 | Altshuler | |
| 5,848,611 A | | 12/1998 | Stanevich | |

* cited by examiner

*Primary Examiner*—John Fox
(74) *Attorney, Agent, or Firm*—Akin, Gump, Strauss, Hauer & Feld, L.L.P.

(57) ABSTRACT

In a fluidic device, a space (35) is formed in a passage block (26) to which a plurality of fluidic modules are connected and which is provided, in its inside, with fluid passages (43, 47, 51) for connecting the plurality of fluidic modules to one another. An internal body (36) is received in the space (35). Channels (37, 38, 39) are formed in an outer surface of the internal body so that the channels (37, 38, 39) constitute part of the fluid passages.

3 Claims, 9 Drawing Sheets

FLUIDIC DEVICE

CROSS-REFERENCE TO RELATED APPLICATIONS

This application is a divisional of U.S. application Ser. No. 09/528,638 filed Mar. 20, 2000 now U.S. Pat. No. 6,435,205, entitled "FLUIDIC DEVICE".

BACKGROUND OF THE INVENTION

The present invention relates to a fluidic device comprising a plurality of fluidic modules, and a passage block to which the plurality of fluidic modules are connected and which is provided, in its inside, with fluid passages for communicating the plurality of fluidic modules with one another.

For example, a device as shown in FIGS. 9, 10 and 11 is known as a background-art fluidic device. The device comprises a plurality of fluidic modules such as a fluid pump not shown, a tank not shown, a fluid-controlled valve 11 and an actuator 12, and a passage block 13 to which the fluid pump, the tank, the fluid-controlled valve 11, and the actuator are attached. The passage block 13 is provided, in its inside, with four fluid passages. That is, in the passage block 13, there are provided a feed passage 14 for connecting the fluid pump and the fluid-controlled valve 11 to each other, an exhaust passage 15 for connecting the tank and the fluid-controlled valve 11 to each other, a head-site feed and exhaust passage 17 for connecting the fluid-controlled valve 11 and a head-site chamber 16 of the actuator 12 to each other, and a rod-site feed and exhaust chamber 19 for connecting the fluid-controlled valve 11 and a rod-site chamber 18 of the actuator 12 to each other.

Incidentally, the feed passage 14, the exhaust passage 15 and the feed and exhaust passages 17 and 19 are bent meanderingly because both ends of each passage is generally not on one and the same axis. Taking the rod-site feed and exhaust passage 19 as an example, the passage 19 is bent three times because the passage 19 has a first passage portion 19*a* extending downward from an upper surface of the passage block 13, a second passage portion 19*b* extending. backward from a lower end of the first passage portion 19*a*, a third passage portion 19*c* extending leftward from an intermediate portion of the second passage portion 19*b*, and a fourth passage portion 19*d* extending downward from an intermediate portion of the third passage portion 19*c*. Further, an opening end of an intermediately located passage portion (straight hole) such as the second passage portion 19*b* is closed by a plug 23 which has, as shown in FIG. 12, a body 20 inserted from its forward end side into the opening end portion of the second passage portion 19*b*, a hole 21 formed in the body 20, and a plug 22 implanted in the hole 21 to widen the diameter of a rear end portion of the body 20.

If the fluid passages are bent meanderingly as described above, each fluid passage needs passage portions of the number obtained by addition of one to the number of bends. When, for example, the fluid passage is bent three times, the fluid passage needs four passage portions (straight holes). As a result, there is a problem that the cost of the resulting device is increased because a troublesome drilling process is required as well as the structure of the device is complicated. Moreover, the opening end portion of each intermediate passage portion (straight hole) must be processed with sufficiently high accuracy to be closed by the aforementioned plug 23. As a result, there is also a problem that the cost of the device is increased more greatly. Moreover, stress concentration is apt to occur in each bending portion of the fluid passage, that is, in a joint between adjacent passage portions of the fluid passage because such adjacent passage portions is crossed each other at 90 degrees. To prevent such stress concentration, it is necessary to chamfer each bending portion. As a result, there is a further problem that the cost of the device is increased more and more greatly.

SUMMARY OF THE INVENTION

An object of the present invention is to provide a fluidic device which is simple in structure and which can be produced inexpensively.

The above object can be achieved by a fluidic device comprising a plurality of fluidic modules, and a passage block to which the plurality of fluidic modules are connected and which is provided, in its inside, with fluid passages for communicating the plurality of fluidic modules to one another, wherein: a space is formed in the passage block; and an internal body is received in the space liquid-tightly, channels being formed in an outer surface of the internal body so that the channels form part of the fluid passages.

In the present invention, the fluid passages are partially formed by the channels formed in the internal body. Since such channels are formed in the outer surface of the internal body, the work for forming the channels becomes so easy that the resulting device can be produced inexpensively as well as the channels becomes simple in structure compared with a plurality of straight drill holes. Moreover, a process of closing each opening end with a plug and a process of chamfering each bending portion become needless, so that the resulting device can be produced more inexpensively. Incidentally, since the internal body is received in the space so liquid-tightly that the channels are sealed securely individually, there is no fluid leakage.

Further, according to the configuration as described in claim 2, the work for forming the space, the internal body and the channels becomes easy.

Further, according to the configuration as described in claim 3, the work for forming the channels becomes easy.

Further, according to the configuration as described in claim 4, the internal body can be positioned easily with sufficiently high accuracy.

The present disclosure relates to the subject matter contained in Japanese patent application No. Hei. 11-347184 (filed on Dec. 7, 1999), which is expressly incorporated herein by reference in its entirety.

DESCRIPTION OF THE PREFERRED EMBODIMENT

An embodiment of the present invention will be described below with reference to the drawings.

Figure 1:
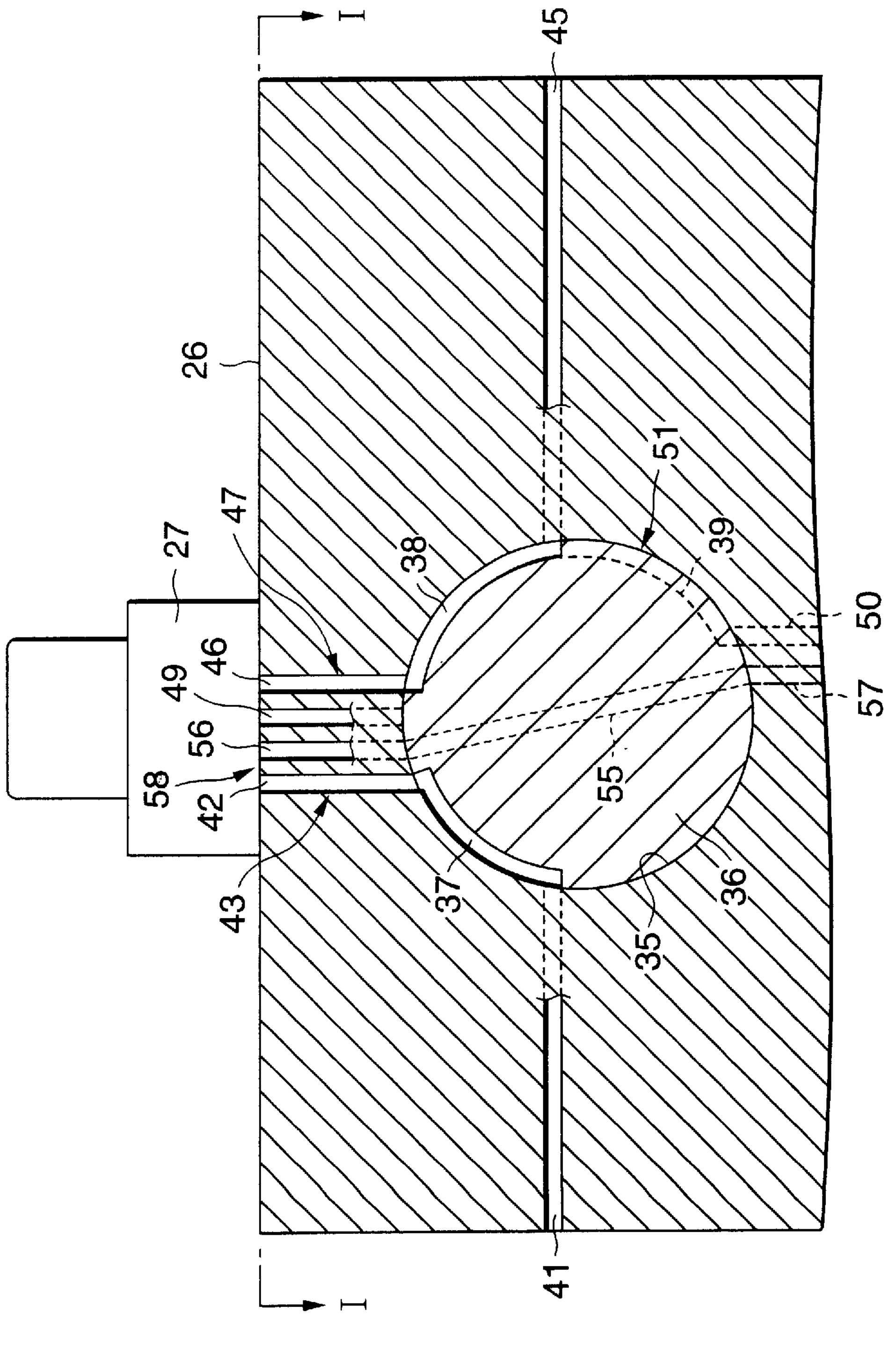
FIG. 1 is a frontal sectional view showing an upper half of an embodiment of the present invention.
Figure 2:
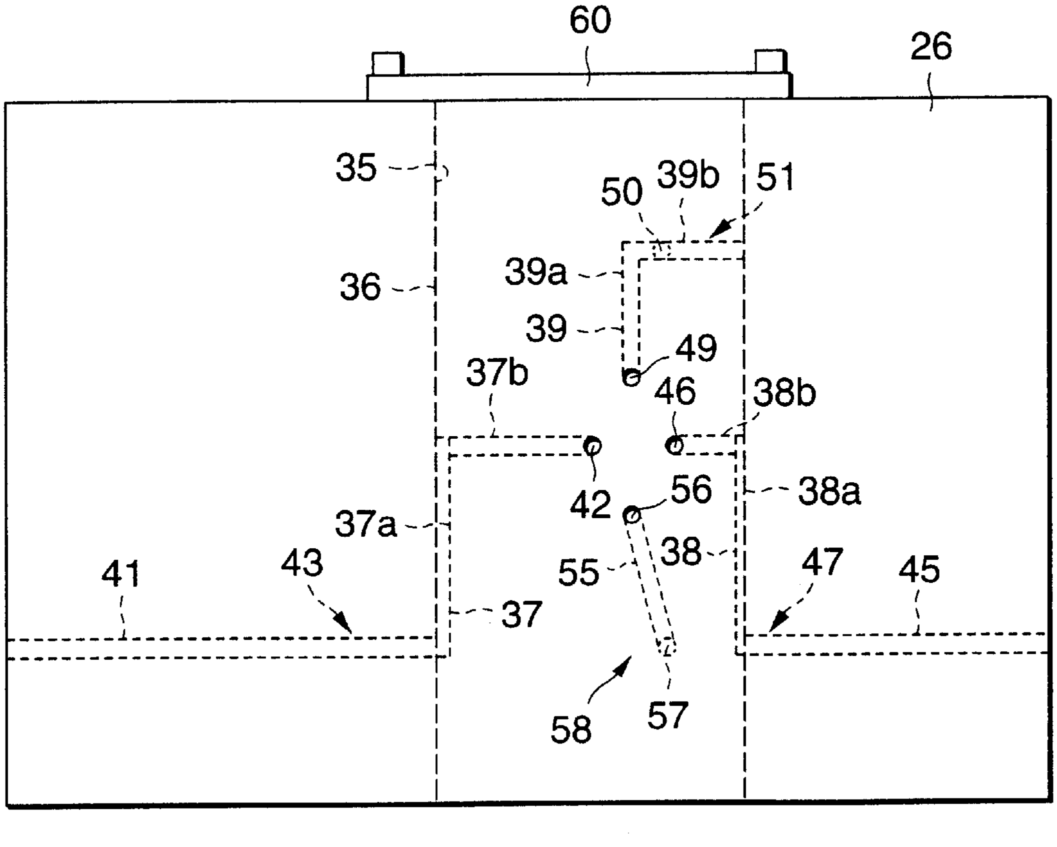
FIG. 2 is a view from the arrow I—I in FIG. 1.
Figure 3:
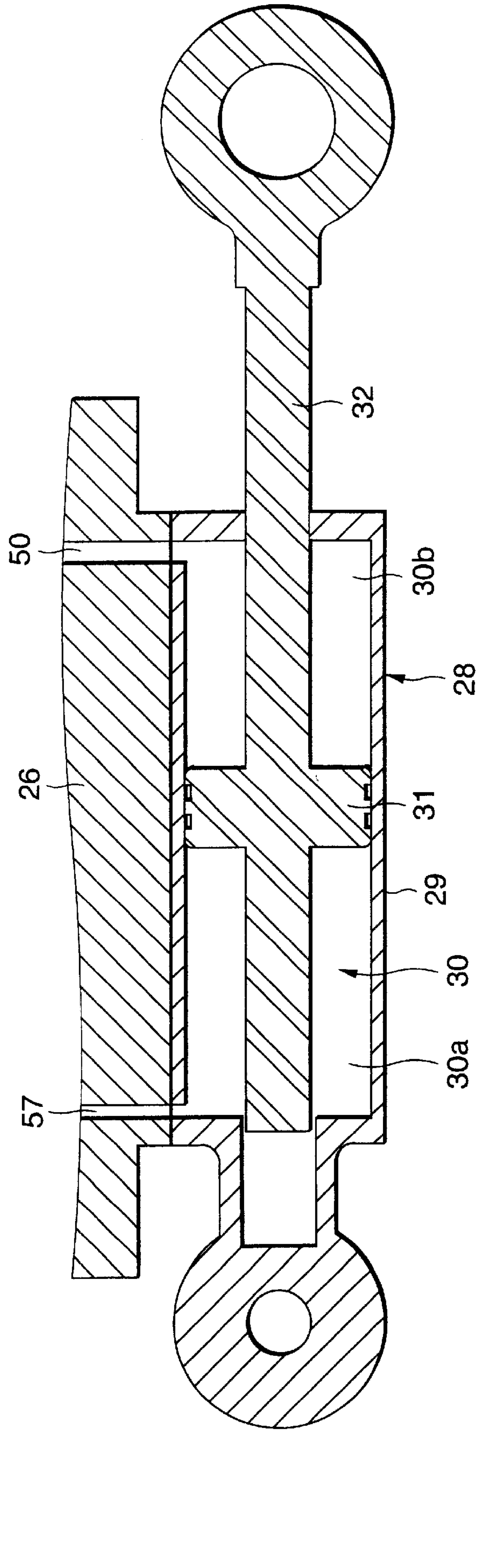
FIG. 3 is a right sectional view of a lower half thereof.
Figure 4:
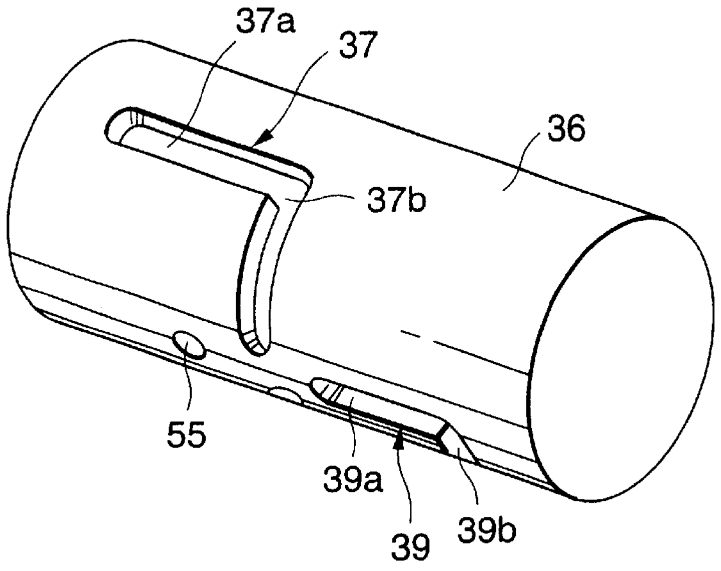
FIG. 4 is a perspective view of the internal body.
Figure 5:
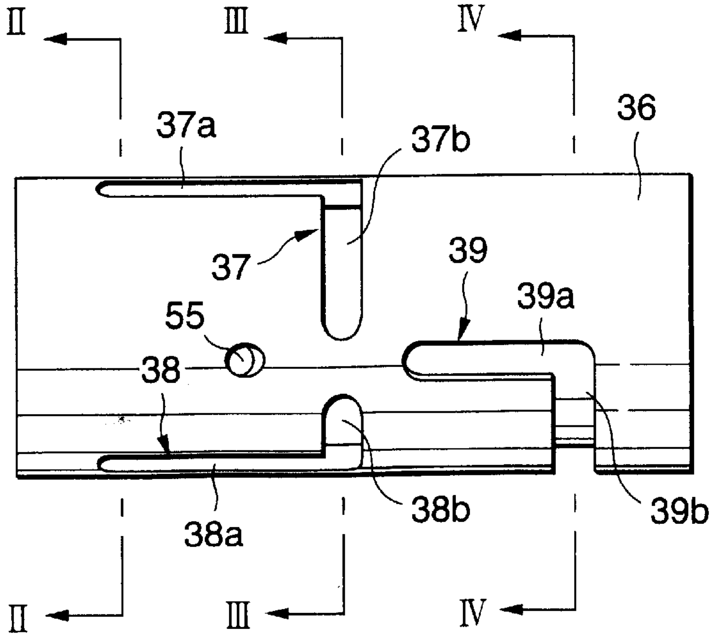
FIG. 5 is a plan view of the internal body.
Figure 6:
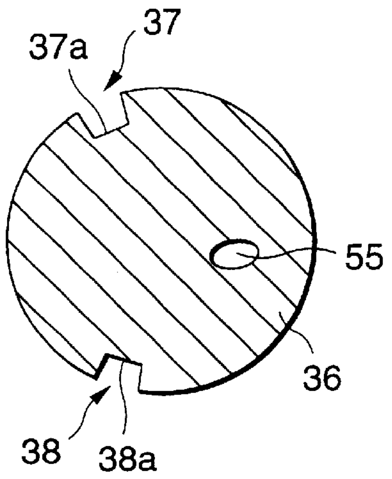
FIG. 6 is a sectional view from the arrow II—II in FIG. 5.
Figure 7:
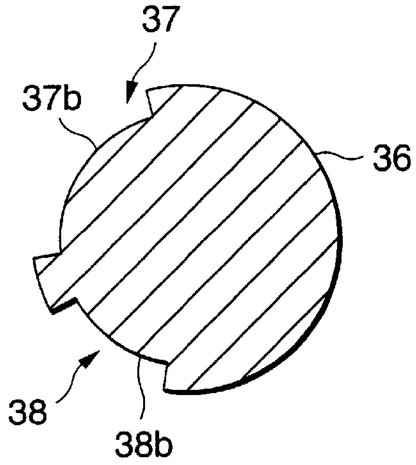
FIG. 7 is a sectional view from the arrow III—III in FIG. 5.
Figure 8:
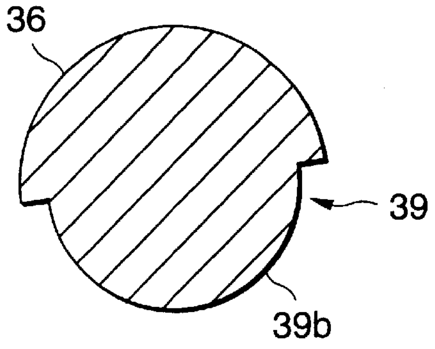
FIG. 8 is a sectional view from the arrow IV—IV in FIG. 5.
Figure 9:
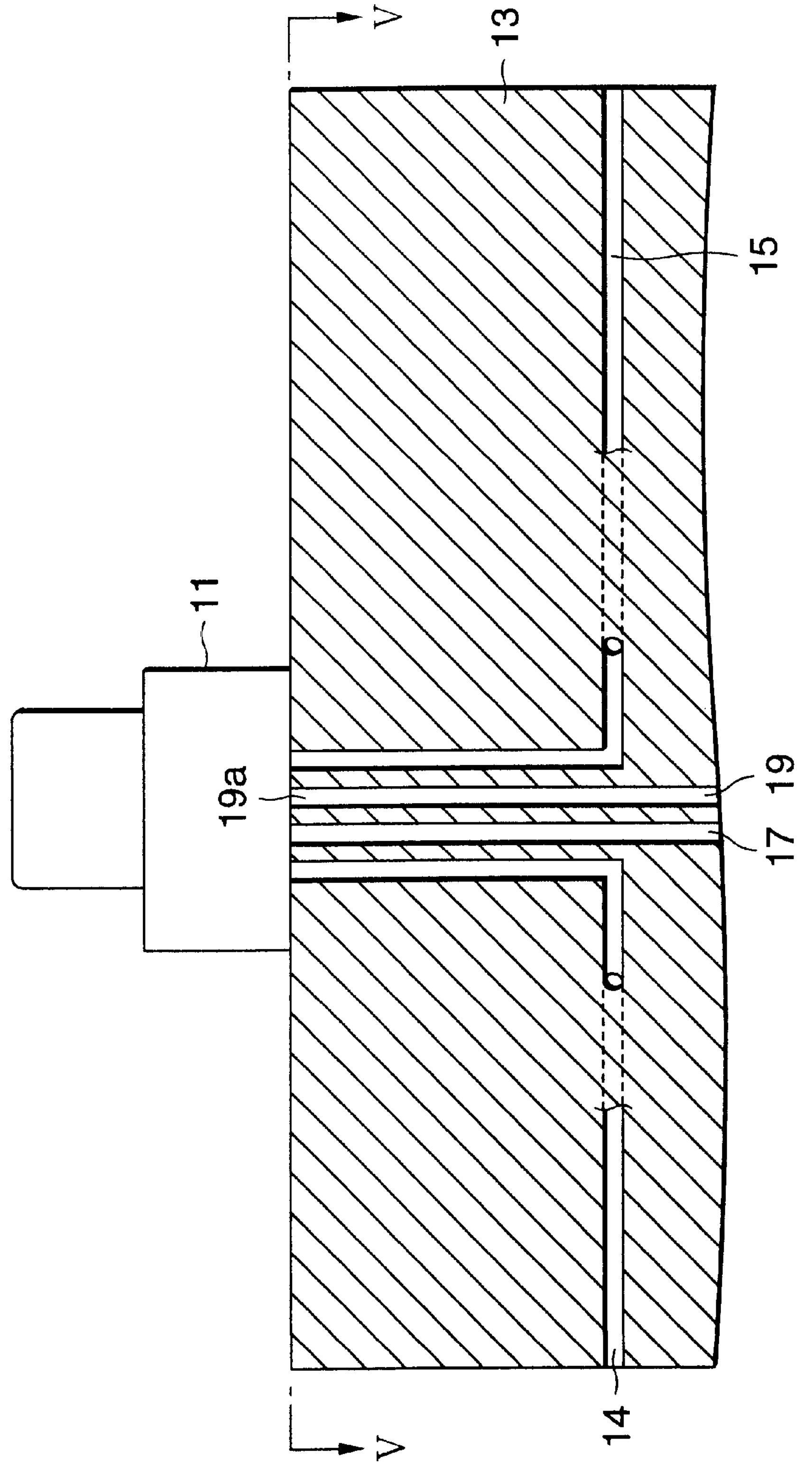
FIG. 9 is a frontal sectional view showing an upper half of an example of a background-art fluidic device.
Figure 10:
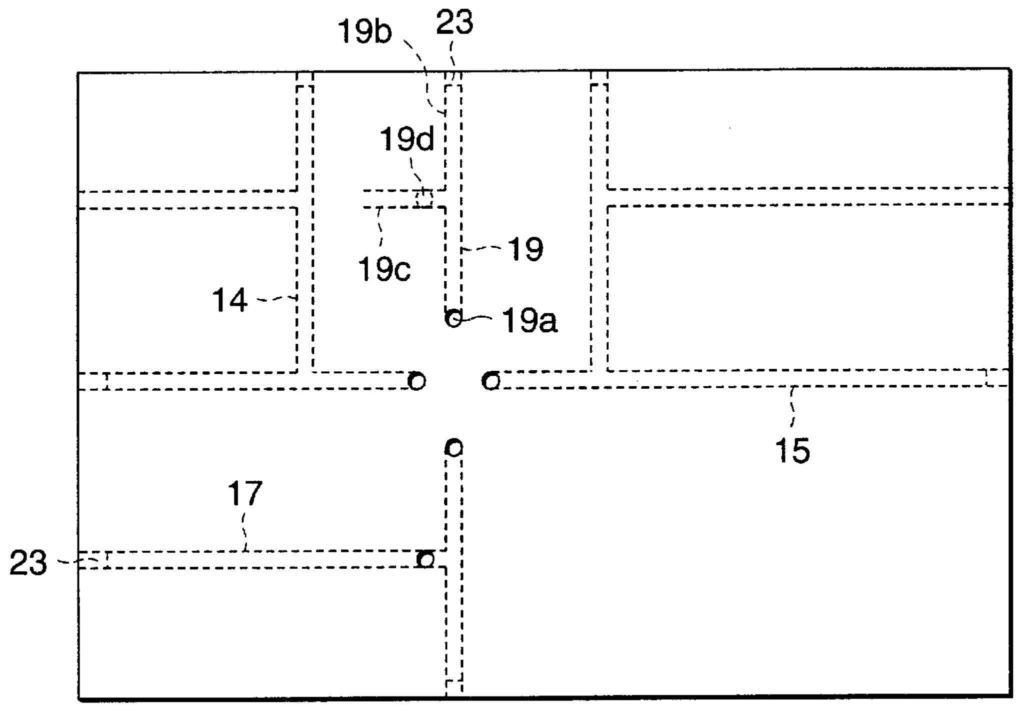
FIG. 10 is a view from the arrow V—V in FIG. 9.
Figure 11:
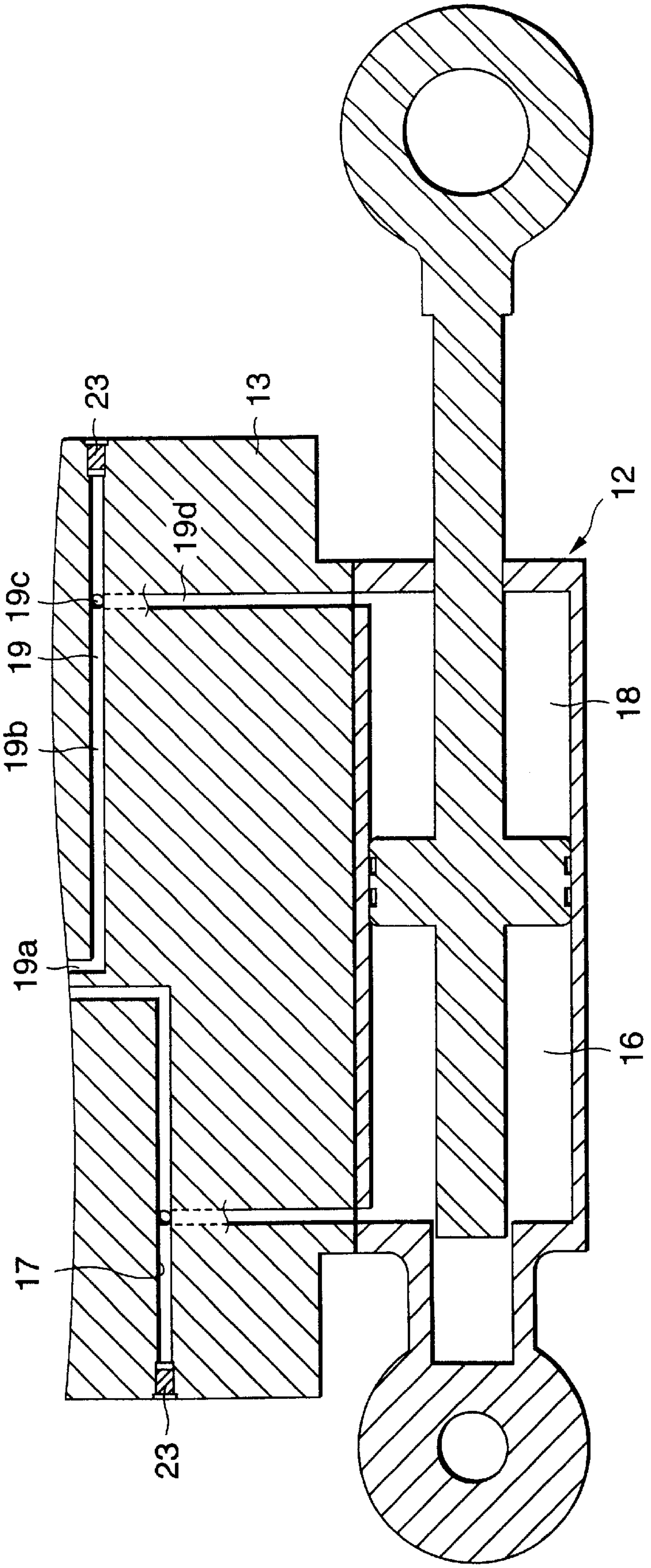
FIG. 11 is a right sectional view of a lower half thereof.
Figure 12:
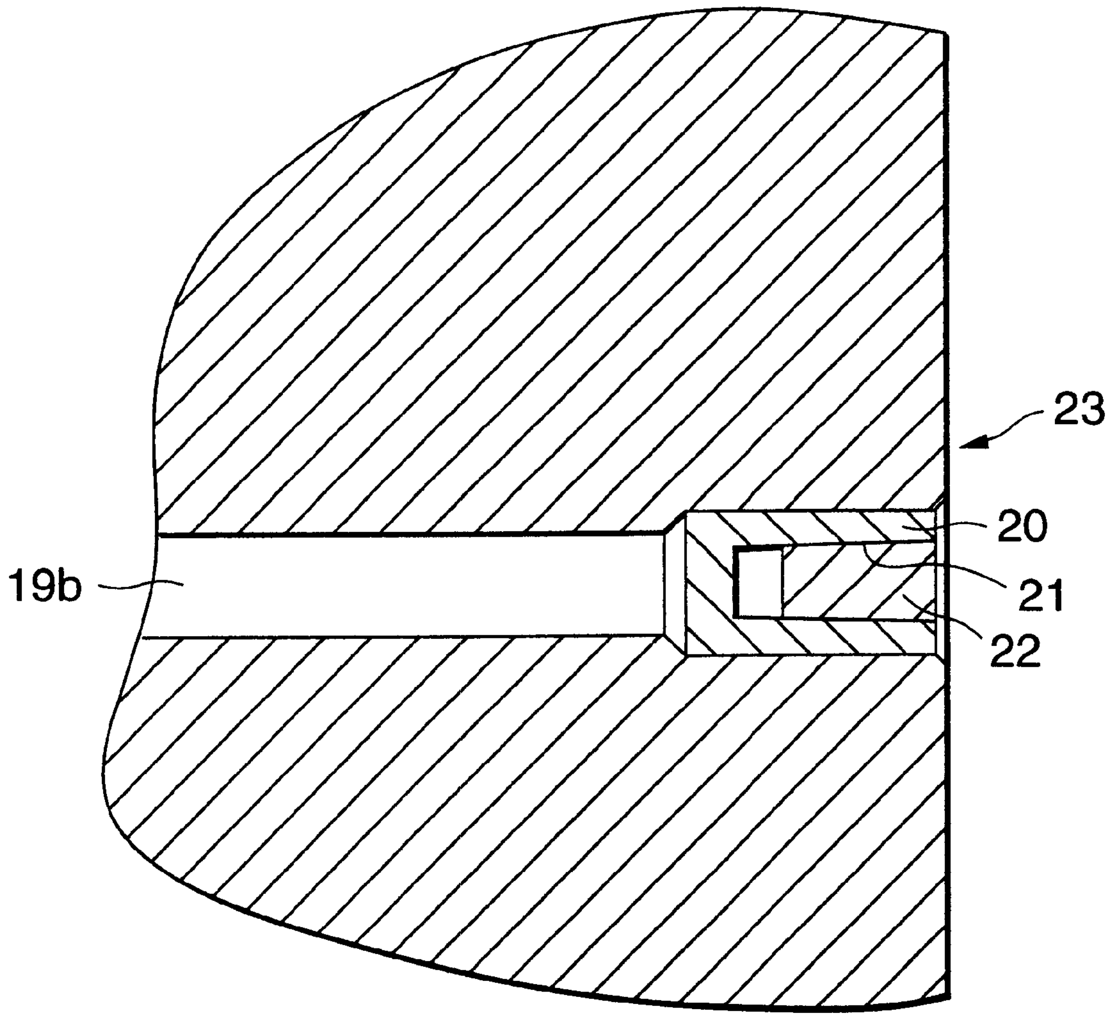
FIG. 12 is a plan sectional view showing an opening end portion of a passage.

In FIGS. 1, 2 and 3, the reference numeral 26 designates a passage block shaped like a rectangular parallelopiped. A fluid-controlled valve 27 as a fluidic module is attached to an upper surface of the passage block 26. Further, a fluid pump and a tank as fluidic modules not shown are connected to left and right ends, respectively, of the passage block 26 through pipe conduits (not shown). Further, an actuator 28 for aircraft spoiler as a fluid module is attached to a lower surface of the passage block 26. The actuator 28 has a casing 29 extending back and forth, a piston 31 slidably received in the casing 29 for partitioning a cylinder chamber 30 in the casing 29 into a head-site chamber 30*a* and a rod-site chamber 30*b,* and a piston rod 32 integrally attached to the piston 31 and passing through a rear end wall of the casing 29. In this manner, a plurality of fluidic modules are attached to the passage block 26.

In FIGS. 1 to 8, a columnar space 35 is formed in a central portion of the passage block 26 so as to extend back and forth while passing through the passage block 26. A solid columnar internal body 36 having the same diameter as that of the space 35 is received in the space 35. First, second and third channels 37, 38 and 39, which do not cross one another, are formed in an outer surface of the internal body 36, that is, in a circumferential surface of the internal body 36 in this embodiment. The first, second and third channels 37, 38 and 39 are rectangular in sectional view and approximately equal in depth to one another. If the space 35 and the internal body 36 are constituted by a columnar space and a column respectively and the first, second and third channels 37, 38 and 39 are formed in the circumferential surface of the internal body 36 in the aforementioned manner, the work for forming the space 35, the internal body 36 and the channels 37, 38 and 39 becomes easy.

The first channel 37 has a first axial portion 37*a* extending axially backward from a front end portion of the internal body 36, and a first circumferential portion 37*b* extending circumferentially by about a quarter circuit from a rear end of the first axial portion 37*a.* The reference numeral 41 designates a first feed passage portion formed in the passage block 26. One end of the first feed passage portion 41 is. connected to the pipe conduit of the fluid pump. The other end of the first feed passage portion 41 communicates with one end of the first channel 37, that is, with a front end of the first axial portion 37*a.* Further, a second feed passage portion 42 is formed in the passage block 26. One end of the second feed passage portion 42 communicates with the other end of the first channel 37, that is, with a backward end of the first circumferential portion 37*b.* The other end of the second feed passage portion 42 is connected to the fluid-controlled valve 27. The foregoing first and second feed passage portions 41 and 42 and the first channel 37, which are provided in the passage block 26, entirely constitute a feed passage 43 which serves as a fluid passage for connecting the fluid pump and the fluid-controlled valve 27 to each other.

Further, the second channel 38 has a second axial portion 38*a* extending axially backward from a front end portion of the internal body 36 so as to be at a distance of an about half circuit from the front end of the first axial portion 37*a,* and a second circumferential portion 38*b* extending circumferentially by an about quarter circuit from a rear end of the second axial portion 38*a* toward the first circumferential portion 37*b.* The reference numeral 45 designates a first exhaust passage portion formed in the passage block 26. One end of the first exhaust passage portion 45 is connected to the pipe conduit of the tank. The other end of the first exhaust passage portion 45 communicates with one end of the second channel 38, that is, with a front end of the second axial portion 38*a.* Further, a second exhaust passage portion 46 is formed in the passage block 26. One end of the second exhaust passage portion 46 communicates with the other end of the second channel 38, that is, with a backward end of the second circumferential portion 38*b.* The other end of the second exhaust passage portion 46 is connected to the fluid-controlled valve 27. The foregoing first and second exhaust passage portions 45 and 46 and the second channel 38, which are provided in the passage block 26, entirely constitute an exhaust passage 47 which serves as a fluid passage for connecting the tank and the fluid-controlled valve 27 to each other.

Further, the third channel 39 has a third axial portion 39*a* extending axially backward from a position slightly in the rear of a midpoint between the backward ends of the first and second circumferential portions 37*b* and 38*b,* and a third circumferential portion 39*b* extending circumferentially by an about half circuit from a rear end of the third axial portion 39*a* in the same direction as the first circumferential portion 37*b.* The reference numeral 49 designates a first rod-site feed and exhaust passage portion formed in the passage block 26. One end of the first rod-site feed and exhaust passage portion 49 is connected to the fluid-controlled valve 27. The other end of the first rod-site feed and exhaust passage portion 49 communicates with one end of the third channel 39, that is, with a front end of the third axial portion 39*a.* Further, a second rod-site feed and exhaust passage portion 50 is formed in the passage block 26. One end of the second rod-site feed and exhaust passage portion 50 communicates with the other end of the third channel 39, that is, with a backward end of the third circumferential portion 39*b.* The other end of the second rod-site feed and exhaust passage portion 50 is connected to the rod-site chamber 30*b* of the actuator 28. The foregoing first and second rod-site feed and exhaust passage portions 49 and 50 and the third channel 39, which are provided in the passage block 26, entirely constitute a rod-site feed and exhaust passage 51 which serves as a fluid passage for connecting the fluid-controlled valve 27 and the actuator 28 to each other.

In this manner, the plurality (four) of fluidic modules, that is, the fluid pump, the tank, the fluid-controlled valve 27 and the actuator 28 are connected to one another by the fluid passages provided in the passage block 26, that is, the feed passage 43, the exhaust passage 47 and the rod-site feed and exhaust passage 51. Parts (intermediate portions) of the feed passage 43, the exhaust passage 47 and the rod-site feed and exhaust passage 51 are constituted by the first, second and third channels 37, 38 and 39 formed in the outer surface of the internal body 36. If the first, second and third channels 37, 38 and 39 are formed to have the first, second third axial portions 37*a,* 38*a* and 39*a* and the first, second and third circumferential portions 37*b,* 38*b* and 39*b* in the aforementioned manner, the work for forming the channels becomes easy.

Further, a through-hole 55 slightly inclined with respect to the central axis is formed in the internal body 36. One end of the through-hole 55 is opened in a position slightly in the front of the midpoint between the backward ends of the first and second circumferential portions 37*b* and 38*b*. The other end of the through-hole 55 is opened in a position slightly in the front of the one-end opening and at a distance of about a half circuit from the one-end opening. The reference numeral 56 designates a first head-site feed and exhaust passage portion formed in the passage block 26. One end of the first head-site feed and exhaust passage portion 56 is connected to the fluid-controlled valve 27. The other end of the first head-site feed and exhaust passage portion 56 communicates with the one-end opening of the through-hole 55. Further, a second head-site feed and exhaust passage portion 57 is formed in the passage block 26. One end of the second head-site feed and exhaust passage portion 57 communicates with the other-end opening of the through-hole 55. The other end of the second head-site feed and exhaust passage portion 57 is connected to the head-site chamber 30*a* of the actuator 28. The first and second head-site feed and exhaust passage portions 56 and 57 and the through-hole 55, which are provided in the passage block 26, entirely constitute a head-site feed and exhaust passage 58 for connecting the fluid-controlled valve 27 and the actuator 28 to each other.

The reference numeral 60 designates a flange which is formed at a rear end (backward end) of the internal body 36 and which has a larger diameter than the inner diameter of the space 35. When the flange 60 is made to abut on the outer surface of the passage block 26, especially on the rear end surface of the passage block 26, after the internal body 36 has been inserted from its forward end side into the space 35, the flange 60 determines the position of the internal body 36 to be received easily with sufficiently high accuracy so that the first channel 37 communicates with the first and second feed passage portions 41 and 42 securely, the second channel 38 communicates with the first and second exhaust passage portions 45 and 46 securely, and the third channel 39 communicates with the first and second rod-site feed and exhaust passage portions 49 and 50 securely. The foregoing internal body 36 is received in the space 35 liquid-tightly by means of press-fitting, shrink-fitting, or the like. As a result, the first, second and third channels 37, 38 and 39 and the through-hole 55 are sealed securely individually. There is no fluid leakage from the channels and the through-hole.

The operation of the embodiment of the present invention will be described below.

Assume now that the fluid-switching valve 27 is switched so that a high-pressure fluid discharged from the fluid pump is fed into the rod-site chamber 30*b* of the actuator 28 through the pipe conduit, the feed passage 43 and the rod-site feed and exhaust passage 51. On this occasion, a low-pressure fluid is extruded from the head-site chamber 30*a* of the actuator 28 into the head-site feed and exhaust passage 58 because the piston rod 32 retracts. The low-pressure fluid is withdrawn into the tank through the exhaust passage 47 and the pipe conduit.

In this case, the portions (intermediate portions) of the feed passage 43, the exhaust passage 47 and the rod-site feed and exhaust passage 51 are constituted by the first, second and third channels 37, 38 and 39 formed in the outer surface of the internal body 36. Hence, the device can be produced inexpensively because the work for forming the fluid passages becomes easy as well as the structure of the device becomes simple compared with the case where the fluid passages are partially formed from a plurality of straight drill holes. Moreover, a process of closing each opening end by a plug and a process of chamfering each bending portion become needless, so that the device can be produced more inexpensively. Particularly when the material for the passage block 26 and the internal body 36 is changed from aluminum to titanium or steel with application of high pressure to fluid, the aforementioned effect becomes more remarkable.

Although the aforementioned embodiment has shown the case where each of the space 35 and the internal body 36 is shaped like a column, the present invention may be applied also to the case where each of the space 35 and the internal body 36 is shaped like a prism. Although the aforementioned embodiment has shown the case where each of the first, second and third channels 37, 38 and 39 has axially extending portions and circumferentially extending portions, the present invention may be applied also to the case where each of the channels extends obliquely (helically) as a whole. Alternatively, valve holes extending axially may be formed in the foregoing internal body and valves may be disposed in the valve holes so that fluids flowing in channels can be controlled by the valves switching. Alternatively, channels may be formed in the inner surface of the space as well as channels are formed in the outer surface of the internal body.

As described above, according to the present invention, the structure of a fluidic device can be simplified and the production cost thereof can be reduced.

What is claimed is:

1. A fluidic device comprising:

a fluid passage distributing unit having a passage block defining outer surfaces and an internal space, and a solid internal body, an outer surface of the internal body being liquid tightly fitted to the internal space;

an actuator attached to a first one of the outer surfaces of the passage block;

a fluid-controlled valve attached to a second one of the outer surfaces of the passage block, wherein the passage block defines:

first fluid passages, extending from the first outer surface to the internal space, by which fluid is supplied to and discharged from the actuator, second fluid passages, extending from the second outer surfaces to the internal space, by which fluid is supplied to and discharged from the fluid-controlled valve, third fluid passages, extending from at least one of the outer surfaces to the internal space, by which fluid is supplied to and discharged from the fluid passage distributing unit;

the internal body defines channels, by which the first, second and third fluid passages are communicated, the channels including:

a first channel formed as a groove extending along the outer surface of the internal body, and a second channel formed as a linear through-hole passing through the internal body, an open end of the second channel being located at a first position in the outer surface of the internal body, and an opposite end of the second channel being located at a different, second position in the outer surface of the internal body.

2. The fluidic device of according to claim 1, wherein the actuator and the fluid-controlled valve are located opposite from each other diametrically with respect to the internal body.

3. The fluidic device according to claim 2, wherein a piston rod of the actuator extends in parallel to an axis of the internal body.

* * * * *